July 5, 1932.   S. P. TOWNSEND   1,866,238
MOWER
Filed April 24, 1929    2 Sheets-Sheet 1
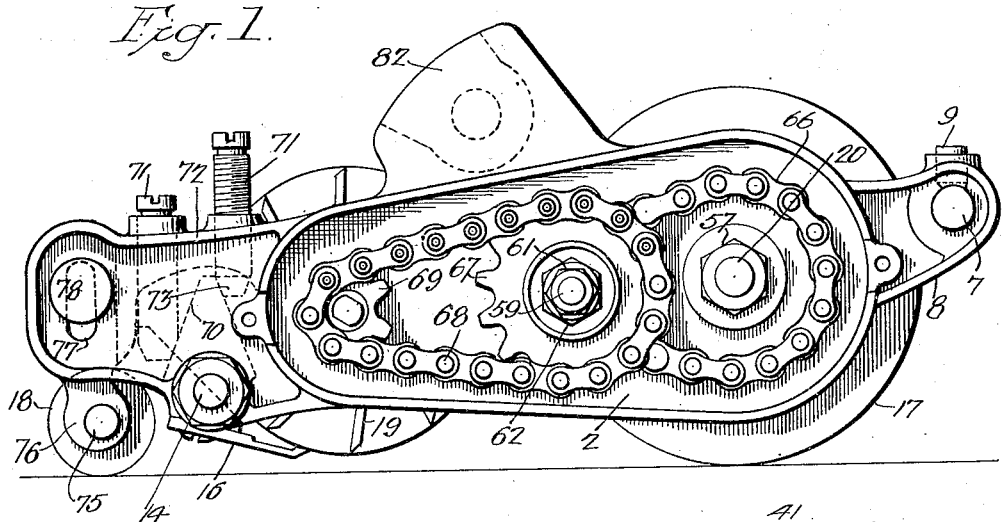
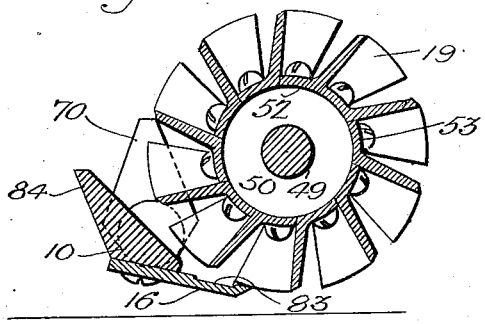
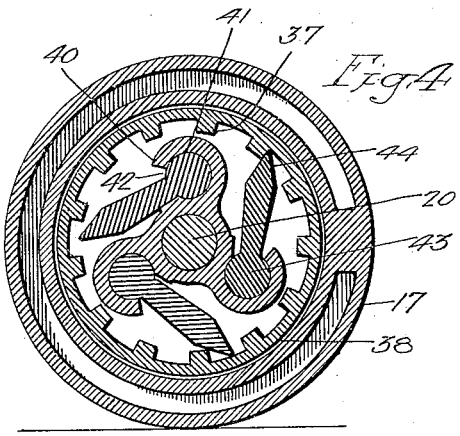
Inventor:
Samuel P. Townsend
by his Attorneys,
Howson & Howson

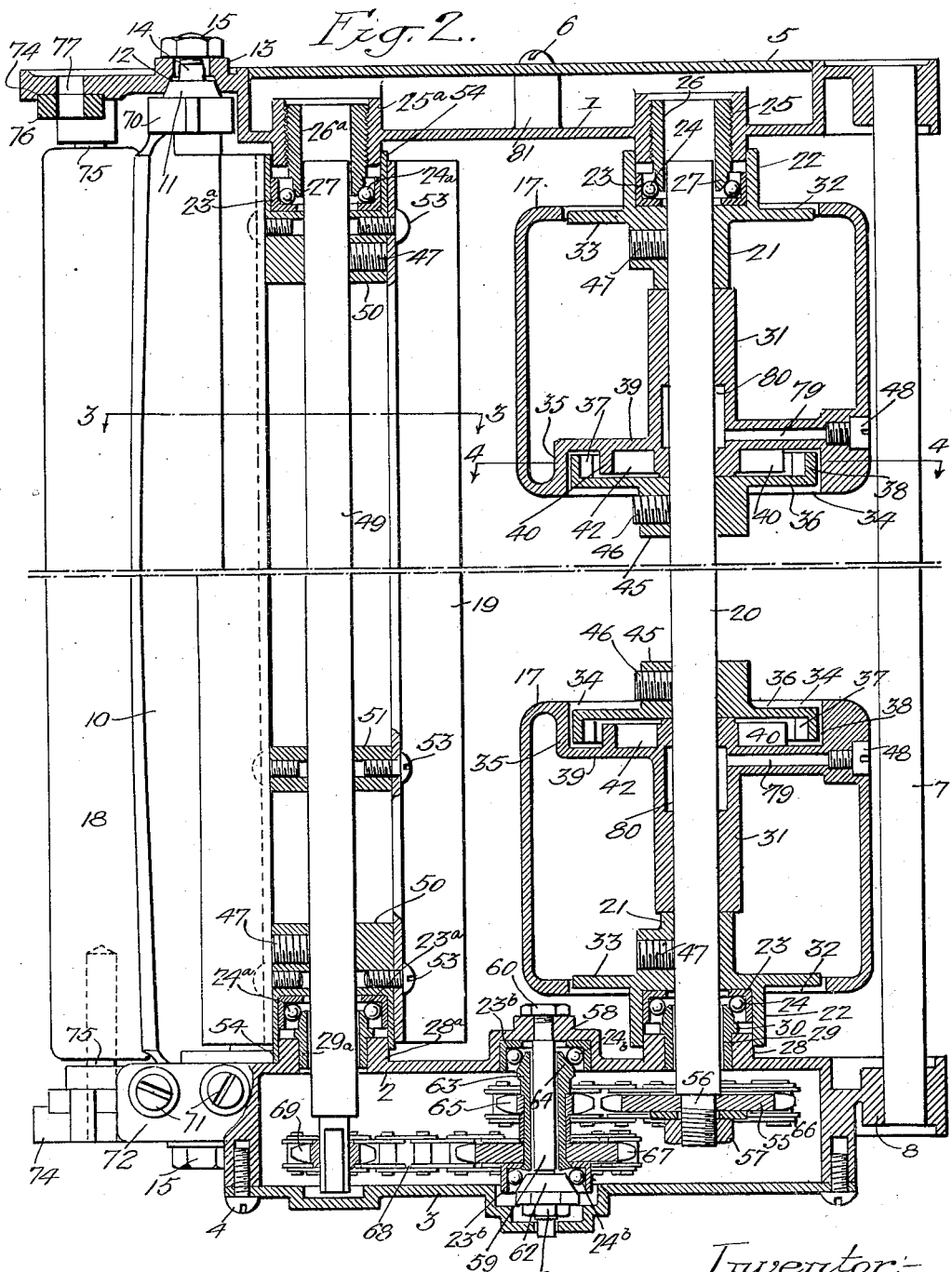

Patented July 5, 1932

1,866,238

UNITED STATES PATENT OFFICE

SAMUEL P. TOWNSEND, OF BLOOMFIELD, NEW JERSEY

MOWER

Application filed April 24, 1929. Serial No. 357,749.

My invention relates to improvements in mowers, particularly lawn mowers for cutting grass.

An object of the invention is to provide a lawn mower of considerable capacity, especially designed for trimming grass closely and smoothly, as is required, for example, on the putting greens of golf courses.

A further object of the invention is to provide a lawn mower of light but strong construction, easy, and inexpensive to manufacture and assemble, and very efficient in operation.

Another object of the invention is to provide a lawn mower, the parts of which can be very easily adjusted and maintained in the desired position without risk of becoming loosened through displacement of the parts by which the adjustment is made.

A still further object of the invention is to provide a lawn mower having a novel type of rotating cutter blade by which the blades of grass are sheared.

The nature and advantages of the invention are fully set forth in the following description, which discloses an embodiment of the invention, but I wish it to be understood that I may resort to many variations of structure and changes in shape, size and arrangement of the various elements of the mower, without departing from the principle of the invention or exceeding its spirit and scope.

On the drawings:

Fig. 1 is a side view of a mower according to the invention, showing connections for driving the cutter blades;

Fig. 2 is a horizontal section through the body of the mower;

Fig. 3 is a transverse section through the cutter blades and the shear plate on line 3—3 of Fig. 2; and Fig. 4 shows in section the one-way driving connection between the wheels of the mower and the cutter blades, the section being on line 4—4 of Fig. 2.

The same numerals identifying the same parts throughout this description.

The numeral 1 indicates one of the side plates or frames of the structure of the mower, the opposite side plate or frame being indicated at 2. These side plates may be provided by casting, and may be depressed to have the form of casings. The casing of the side frame 2 is provided with a cover plate 3, attached by screws 4, and the casing of the side plate 1 with a cover plate 5, held on by a screw or like fastening device 6. These covers 3 and 5 shield the inside of the casings thus formed between the front and rear extremities of the side plates 1 and 2, so that the operating parts of the mower can be conveniently mounted and housed. The side plate 1 carries only the bearings for the shafts of the mower; while the side plate 2 mounts and encloses the connections by which the knives are revolved.

At their front ends side plates 1 and 2 are joined by a cross bar 7, the ends of which are received in bearings 8 on the side plates 1 and 2. Screws 9 in the bearings engage cross bar 7 to hold the parts rigidly together. At their rear ends, the plates 1 and 2 are united by a cross bar 10, the extremities of which terminate in cone-shaped projections 11, which are received in conical recesses 12 on the inner faces of the side plates. These recesses 12 lead through bearings 13 and from the conical projection 11 extend journals 14 threaded to receive lock nuts 15. The journals pass through bearings 13 and lock nuts 15 are carried on the outer ends of the journals 14 and abut against bearings 13. The bar 10 has secured to its lower edge a shear plate 16.

The principal operating rollers for the mower are shown at 17, at the front, while at the rear is a supporting roller 18. Between the front rollers 17 and rear roller 18 is the cutter member carrying the blades 19, mounted in co-operative relation with the forward edge of the shear blade 16.

The rollers 17 are carried on the shaft 20, and ball bearings are provided for the opposite ends of the shaft in the side plates 1 and 2. To the shaft are secured, near the ends thereof, hubs 21, having hollow bosses 22, projecting towards the side plates 1 and 2; and in these bosses are members 23 providing raceways to receive anti-friction balls 24. The plate 1 has a threaded boss 25, in which is secured a threaded sleeve 26, receiving the adjacent extremity of shaft 20, and having one end 27 coned to engage the balls 24.

The bottom of the casing in the plate 2 has a boss 28, which projects into the boss 22 of the adjacent hub 21; this boss also carrying raceway members 23 and bearing balls 24. The boss 28 mounts a bushing 29, having a collar or shoulder 30, which abuts the inner end of the boss; and the extremity of the bushing 29 is also coned to engage the balls 24. Thus the shaft is mounted to rotate freely and easily by the plates 1 and 2.

The wheels 17 are both in the form of hollow cylinders having hubs 31 mounted to turn freely with respect to the shaft 20. At one end the cylinders are open at 32 but the hubs 21 have collars 33, which are disposed within the open ends of the rollers to prevent the entrance of dirt and other foreign substances. The opposite ends of the rollers are depressed as shown at 34; the rollers 17 being provided with reentrant parts 35 to form the depressed ends 34. These ends receive discs 36, having internal teeth on rims 38, presented to the depressed ends 34 of the rollers. The bottoms of these depressed ends are indicated at 39, and they bear approximately circular projections 40, having recesses 41, see Fig. 4. These circular projections 40 are not continuous but have side openings 42; and they mount loosely the rounded heads 43 of pawl 44. The heads 43 are simply slipped into recesses 41 of the projections 40 and the pawls can swing as far as the side openings 42 permit. The hubs 45 of the discs 36 are made rigid with the shaft 20 by screws 46, and the screws 47 bind the hubs 21 to the shaft 20.

It will now be seen that as long as the mower moves forward the rollers, which are loose on the shaft 20, will act through the pawls 44 and the teeth 37 of the discs 36 to turn the shaft in the same directions. When the mower is pulled backward, the pawls 44 will simply slip over the teeth 37 and the shaft 20 will not be rotated.

The rollers 17 are provided with threaded plugs 48 which close lubricating openings leading to recesses in the hubs 31 of the rollers, as will be described later.

To actuate the cutter blades 19, I provide a second transverse shaft 49, carrying on its extremities hubs or spiders 50 secured by screws 47. Between the hubs or spiders 50 may be intermediate hubs or spiders 51. Each of the blades 19 is angular in cross section, one web forming the body of the blade and bearing the cutting edge, and the other web 52 being secured to the parts 50 and 51 by screws 53. These angular blades are an important part of my invention, and they are, of course, located in diagonal or spiral position with respect to the axis of the shaft 49. The webs 52 form a continuous cylinder or drum. In the hollow ends of the hub 50 are raceway members 23a receiving bearing balls 24a and the plates 1 and 2 carry sleeves 26a and 29a to mount the shaft 49 in the same manner as the shaft 20. The hollow ends of the hubs or spiders 50 overlap and receive the ends of the bosses 25a and 28a, as shown at 54.

Both shafts 20 and 49 project through the bottom of the casing formed by the plate 2, and the shaft 20 carries a sprocket 55 held against shoulder 56 by nut 57. The plate 2 has a boss 58 in line with a similar boss on the closure 3, to mount a spindle 59. In the boss of the plate 2, which is hollow, is a raceway member 23b, carrying antifriction balls 24b, and the end of spindle 59 which projects through the boss 58 of the plate 2 carries a fastening nut 60. The other end of the spindle projects through the boss of the cover plate 3, and in this boss on the spindle is a nut 61, holding a cone-shaped member 62 against bearing balls 24b in the raceway member 23b. This last raceway member is rigid with a hub 63, the opposite end of which is coned at 64 to engage the antifriction balls supported directly by the plate 2. The hub carries a sprocket 65. Connected to the sprocket 65 is a chain 66. The hub 63 also carries a sprocket 67, over which passes a chain 68 to a sprocket 69 on the shaft 49. Hence the blades 19 will rotate when the shaft 20 rotates as long as the mower is moved forward but will not rotate on the backward movement of the mower.

Bar 10 has upright projections 70, with sloping sides, at its ends adjacent to the inner faces of side plates 1 and 2. These projections act as lever arms to turn bar 10 and adjust shear plate 16. For this purpose, I provide two screws 71, mounted in threaded bearings, in extensions 72 of the side plates 1 and 2. The lower ends 73 of these screws are coned to engage the sloping sides of projections 70. Hence by turning down one screw 71 and turning up the other, the arms 70 at the two sides of the mower can be shifted forward or backward. These screws 71 do not tend to become loose but remain in an adjusted position because the frictional contact between ends 73 and arms 70 holds them fast.

The back roller 18 is journaled in the rear extremities 74 of the side plates. It has trunnions 75 which are fast in bearing arms 76, these bearing arms having openings to register with vertical slots 77 in the side plates. Through the slots 77 and openings in the arm 76 are passed bolts 78 to receive nuts to hold the roller 18 in adjusted vertical position.

The lubricating passages for the rollers 17 are shown at 79 leading to space 80 in the hubs 31. The fastening device 6 for the cover plate 5 may hold this plate against a projection 81 on the side plate 1. On the tops of the side plates may be projections 82 to enable a yoke to be attached to the mower for the operating handle.

I find it advantageous to put the rollers 17 within the side plates. This makes the mower more compact and the knives or cutters 18 less apt to dig into the ground.

The shear plate 16 is always on an incline with respect to the ground and its upper face may be recessed slightly as indicated at 83 to give clearance to the blades or knives 19. The face of the bar 10 adjacent to the plates 18 is inclined upward and backward, as shown at 84.

It will be noted with reference to Fig. 4 that when the rollers 17 are turning at slow speed, one of the pawls will always be in position to engage the teeth at 37. As pawls pass through uppermost position, there is a tendency to drop away from the teeth 37, although when the mower moves fast enough, centrifugal action may counteract this tendency. In any event, not more than one pawl will be out of operative position at one time. This disengagement of each of the pawls, if but once in every revolution, may make the parts last long, because it decreases the wear to which the pawls and teeth are subjected. It also allows the pawls to engage different teeth over long periods of operation.

The rollers 17 might be put in back of the blades 19 if desired, although the construction shown is preferred.

I do not wish, of course to be limited to the exact features of construction described and shown here; as it may often be desirable to make changes in details. For example, the sprocket and chain gearing connecting the shafts 20 and 49 may be replaced with toothed gearing. Also, the projections or plates 70 instead of having opposite sides which slope upward and toward each other may be replaced by arms or plates having sides which slope upward and outward or away from each other. In this case, the screws 71 and 72 will be mounted in the bottom of the side plates 1 and 2 and their heads will project from the lower edges of the side plates; so that to adjust the plate 16, one must get at the screw 71 from below. I may also put spacing sleeves or ferrules inside the cutter blades between the spiders 50 and 51. These spacing sleeves will be of the same diameter as the spiders. When such spacing sleeves are used, the webs 52 need not be so wide and the knives 18 can be farther apart, leaving intervals between the knives and the adjacent webs 52. The inside spacing sleeves or ferrules will then prevent grass from getting between the webs 52 of the shaft 49.

I claim:

1. A lawn mower comprising a shaft, spaced spiders secured to the shaft and each having a substantially circular periphery, a plurality of rigid unitary spirally-extending bars secured to the peripheries of said spiders and combining therewith to produce a substantially cylindrical structure surrounding the shaft, each bar having a substantially radially-projecting flange the outer edge of which is formed as a cutting edge.

2. In a lawn mower, a cutter shaft, a second shaft operatively connected thereto, spaced plates in which the ends of said cutter shaft and second shaft are mounted, hubs on said second shaft and bearing elements carried by the hubs and plates for said second shaft, spaced rollers mounted on said second shaft and each having an open end surrounding one of said hubs and an inwardly-extending hub portion abutting the associated hub whereby movement of the roller is limited in one direction, the hub having a flange closing the opening of the surrounding end of the roller and means preventing separation of the roller hub from the associated shaft hub including a one-way clutch element from the roller engaging the outer end of the roller hub.

SAMUEL P. TOWNSEND.